United States Patent

[11] 3,527,152

| [72] | Inventors | Albert Henry Hands<br>Quarry House, Hall Lane, Maghull, Liverpool, England<br>Joseph McGowan, 57 Winkley Road, Preston, Lancashire, England |
|---|---|---|
| [21] | Appl. No. | 742,289 |
| [22] | Filed | July 3, 1968 |
| [45] | Patented | Sept. 8, 1970 |
| [32] | Priority | July 5, 1967 |
| [33] | | Great Britain |
| [31] | | 30,978/67 and 30,980/67 |

[54] AIR CURTAIN MEANS FOR A PASSENGER VEHICLE
1 Claim, 2 Drawing Figs.

[52] U.S. Cl. .................................................. 98/2, 98/36
[51] Int. Cl. ....................................................... B60h 1/24
[50] Field of Search............................................ 98/87, 2, 36, 10; 62/265

[56] References Cited
UNITED STATES PATENTS

| 2,696,155 | 12/1954 | Aherns ......................... | 98/10 |
| 2,939,374 | 6/1960 | Caille ........................... | 98/36 |

*Primary Examiner*—Meyer Perlin
*Attorney*—Watson, Cole, Grindle and Watson

ABSTRACT: A passenger vehicle having a door and doorway and a distributing and delivery system arranged to form a curtain of heated air in motion across the doorway.

Patented Sept. 8, 1970

3,527,152

INVENTORS
ALBERT HENRY HANDS
JOSEPH McGOWAN

BY *Watson, Cole,
Grindle & Watson*

ATTORNEYS

AIR CURTAIN MEANS FOR A PASSENGER VEHICLE

The invention relates to coach heating and ventilation in passenger vehicles. It will be described in its application to the ventilating, demisting and heating of an omnibus or motor coach body but is equally applicable to other passenger vehicles such as railway coaches.

The invention is concerned with the reduction of heat loss from the passenger compartment when a door is opened. When the doors of such vehicles as motor omnibuses and coaches are operated frequently it is difficult to maintain the saloon at the temperature required for passenger comfort in cold weather.

In accordance with the invention heat loss from the passenger compartment of a vehicle having a door is reduced by means of an air curtain and a vehicle in accordance therewith has an air heating distributing and delivery system arranged to form a curtain of heated air in motion across the opening or each doorway during such time as any door is open.

It is especially convenient to draw the heated air required to set up such a timed air curtain from the main heating and ventilating system described and to dispose the air curtain-forming delivery system along the top of the door or doors to be curtained. Vents along an edge of a doorway can conveniently be arranged in accordance with a further aspect of the invention so as to be sealed by the door or doors when the latter is or are closed, by means of a rubber seal along the corresponding edge or edges of the door or doors.

In order that the invention may be better understood, a system in accordance with it for distributing heating and ventilating air in a motor coach body and for demisting and defrosting by an overhead duct system will be described, by way of example, with reference to the accompanying drawings, in which.

Figure 1:
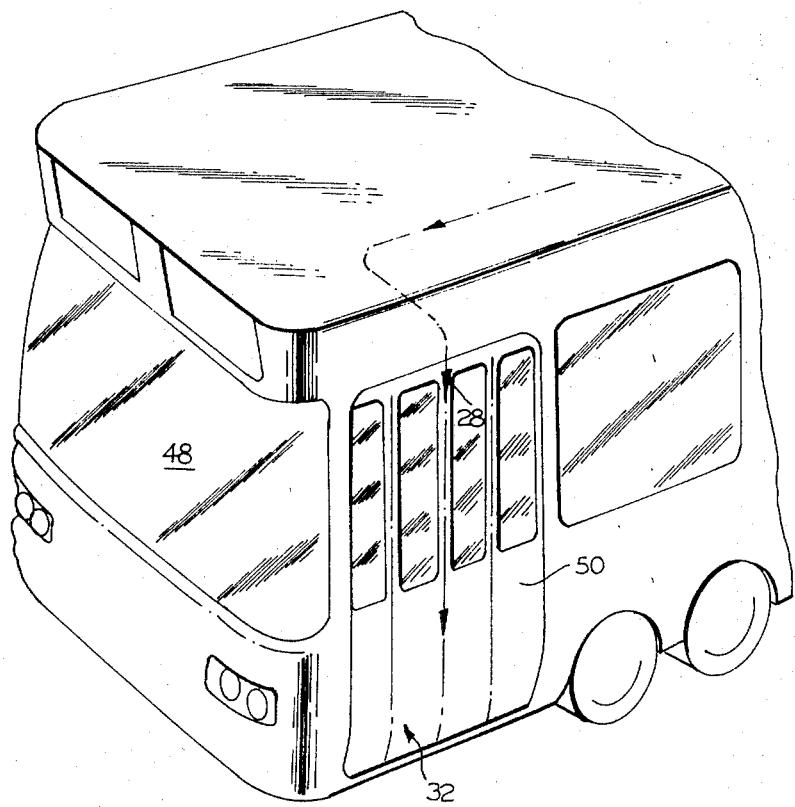
FIG. 1 is a perspective view of the front end and doorway of the vehicle.

An example of the application of the invention to a door of the vehicle is shown in FIG. 1.

The system is so arranged that the warm air flow is set up as a curtain when the door is opened and cut off when the door is fully closed.

The requirement that the air curtain should be timed to coincide with the opening of the doors so that the air flow is initiated when the doors are opened and cut off when they are closed can be met by any of a variety of automatic mechanical means, but such mechanism must necessarily add to first cost and require maintenance if it is to continue to function reliably. In accordance with the invention, the problem of air curtain timing can be solved in a simple and elegant manner and at the same time to eliminate troubles normally experienced with rubber door seals.

In accordance with the invention vents along the top of a vehicle doorway used for the establishment of an air curtain in the doorway are sealed by the door or doors when the latter are closed by means of a rubber seal along the corresponding edge of the door or doors.

Figure 2:
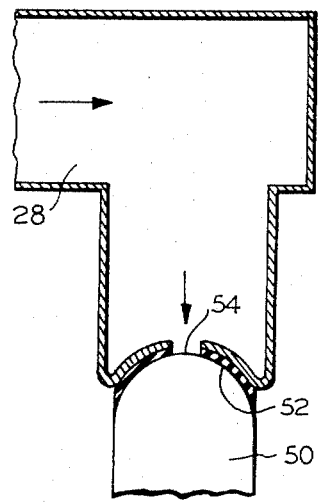
FIG. 2 is a fragmentary cross section of the upper edge of the doorway and of a door taken on line 2—2 of FIG. 1.

The use of the invention is illustrated in FIG. 2 of the accompanying drawings which shows a door 50 with a rubber seal 52 along its upper edge sealing air flow from the duct 28 connected to the main heating system for the vehicle passenger compartment by covering the vent 54. As soon as the door 50 is opened heated air can flow through the vent 54 to establish the required warm air curtain.

We claim:

1. A passenger vehicle having a roof comprising overhead duct with vents formed in said roof and arranged to distribute air for the heating and ventilation of a passenger compartment in the vehicle from the overhead duct vents, a doorway in said vehicle having a duct with vents connected to receive air from said overhead duct and to form a curtain of air in motion across said doorway during such time as the door is open, and a door in said doorway carrying a seal along a top edge thereof and disposed to seal said vent when the said door is closed.